April 18, 1967
G. T. RANDOL
3,314,511
AUTOMOTIVE SPRING-ENGAGEABLE CLUTCH WITH
UNIFORM OPERATING CONTROL
Filed Nov. 19, 1964
3 Sheets-Sheet 1
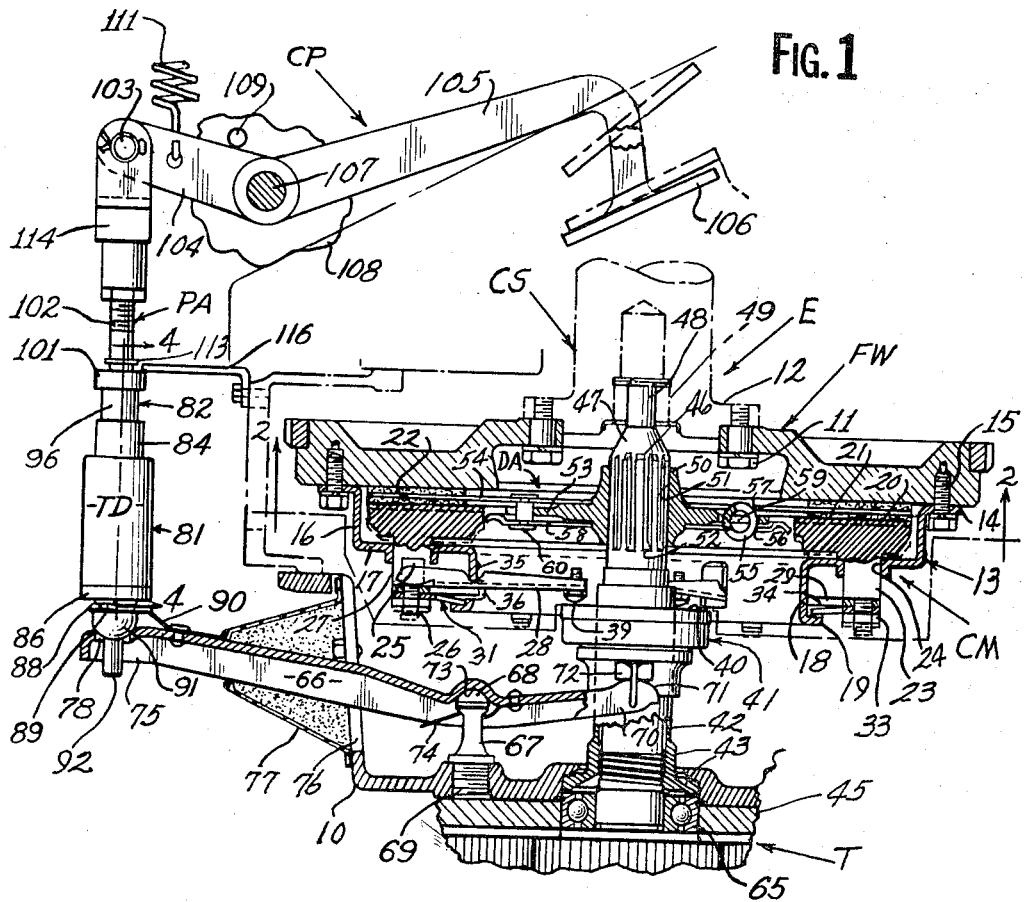
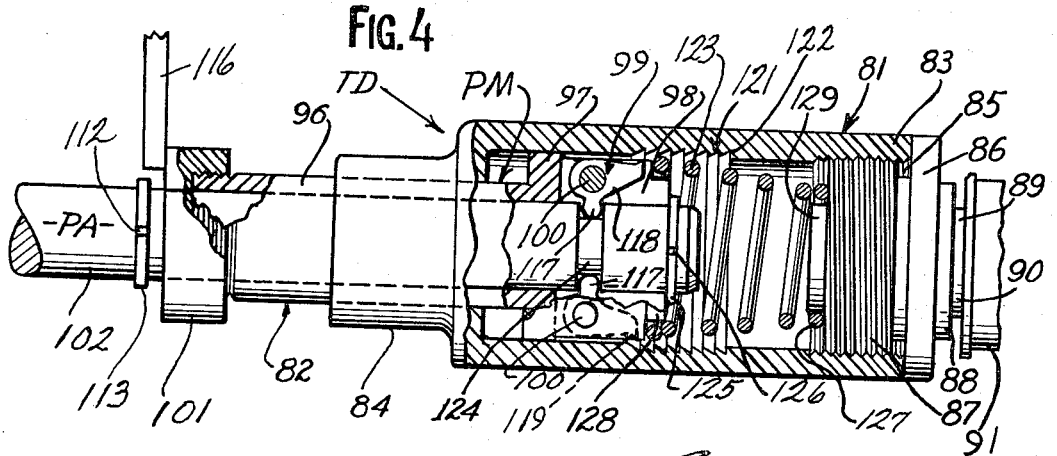
Inventor

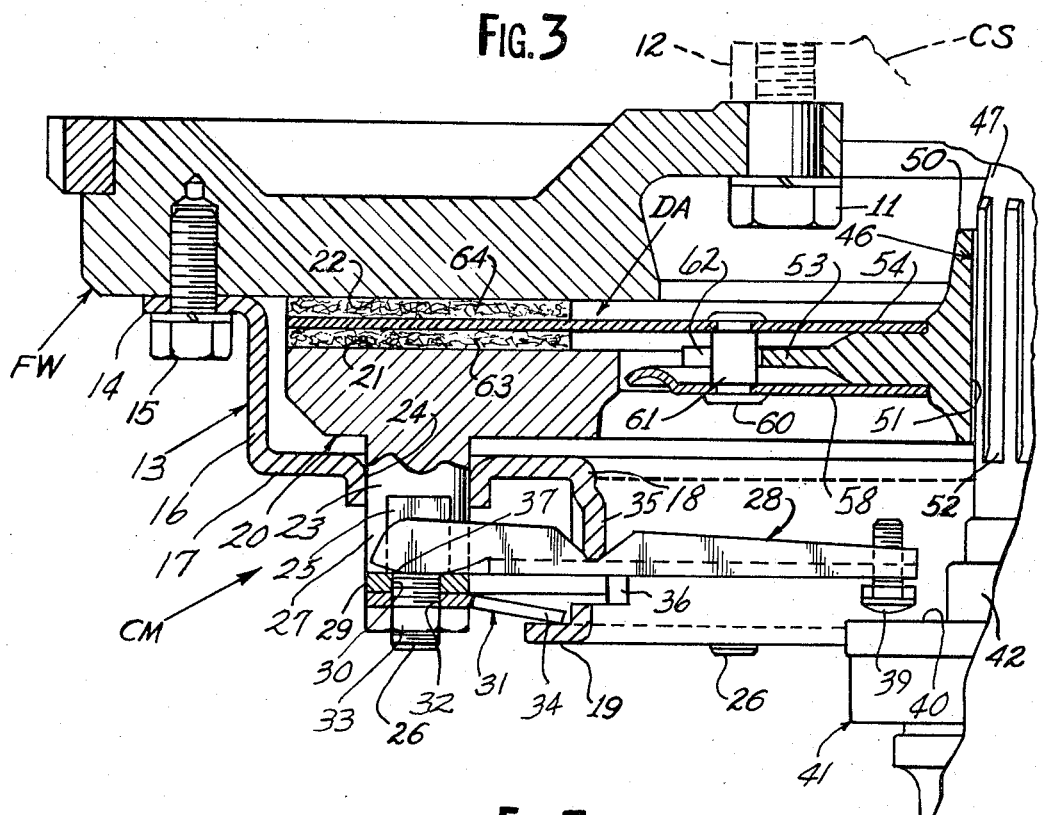
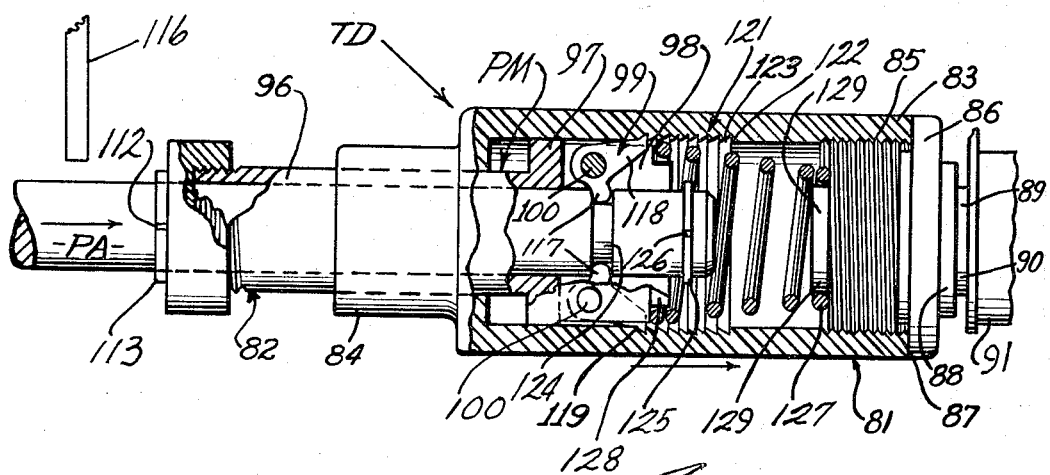

United States Patent Office 3,314,511
Patented Apr. 18, 1967

3,314,511
AUTOMOTIVE SPRING-ENGAGEABLE CLUTCH
WITH UNIFORM OPERATING CONTROL
Glenn T. Randol, Loch Lynn, Md. (3 E. 2nd Ave., Loch Lynn, Mountain Lake Park, Md. 21550)
Filed Nov. 19, 1964, Ser. No. 412,428
5 Claims. (Cl. 192—68)

This invention relates to friction clutch construction and operation, and more particularly to novel and improved spring-engageable clutch mechanism operatively associated with a vehicular internal-combustion engine and to wear compensating means for maintaining uniform actuator operation of said mechanism irrespective of the extent of wear in the clutch facings.

In view of highly congested traffic and high-speed operations, the modern motor vehicle dictates that the controls therefor be easily manipulated and as few and simple as possible, and particularly in vehicles equipped with manual transmissions and pedal-controlled master clutches incorporated on the engine flywheel to facilitate speed-changes in such transmissions in the driving control of the vehicle. Furthermore, such controls as, for example, the clutch-pedal require easy and sensitized operation to reduce driver fatigue and thereby enabling him to control the vehicle with a minimum of effort and movement for safety of control under the above stated driving hazards.

In the conventional type of automotive spring-engageable clutch adapted to transmit drive-torque, when engaged, to a manual change-speed transmission (gearbox), a relatively long stroke of the clutch-operating pedal as well as undue driver effort is required to effect clutch control which results in lack of proper coordination due to time lag and driver fatigue for safely controlling the vehicle under all driving conditions. Also there are limitations on the utilizable leverage-ratio for disengaging the clutch due to the clutch-operating mechanism being incorporated within the clutch housing (cover plate) co-rotatable with the engine flywheel thus necessitating a relatively long pedal stroke to facilitate operator clutch-disengagement to thus avoid undue exertion against the spring-action of the clutch. Moreover, such longer pedal stroke is amplified as wear occurs on the clutch facings which contributes to slower clutch operations with resultant impairment to expeditious and well-timed speed-changing.

The present invention is primarily concerned with improvements to overcome the above noted disadvantages by providing a novel clutch mechanism in which the major portion of the operating parts is incorporated on the exterior of the clutch housing, and having a positive-type wear compensating means associated therewith for maintaining a uniform stroke of the clutch-actuator (pedal).

It is an object of the invention to provide novel clutch mechanism of the type under consideration wherein normally preloaded compressed) spring-engaging means are located outside of the clutch housing, and the clutch-operating means (levers and connecting linkage) are interposed with respect to said spring means and the movable clutch pressure plate on the outer side of said housing for flexibility in establishing the desired leverage-ratio free of clutch housing interference.

Another object of the invention is to provide novel wear compensating means operatively incorporated in the linkage between the clutch-actuator (pedal) and clutch throw-out yoke which acts on the clutch-operating levers through a throw-out bearing, said means being operable automatically to modify the length of the linkage in accordance with changes in the normal released position of the clutch yoke due to wear on the clutch facings and thereby maintaining a uniform pedal stroke for disengaging the clutch against its spring-engaging action throughout the service life of said clutch facings.

A further more specific object of the invention is to provide such a clutch with a relatively short pedal stroke requiring less pedal pressure due to the outside mounting of the operating levers which enables selection of the leverage-ratio between the clutch pressure plate and throw-out bearing conductive to easy clutch-disengagement.

A further specific object of the invention is the provision of a novel spring-engageable clutch characterized by a single Belleville or washer-type engaging spring interposed under normal preload on the exterior of the clutch housing (cover plate) in series therewith and the clutch pressure plate co-rotatable with said housnig, and wherein the clutch-operating lever assembly is located between said housing and said spring for selective leverage-ratios which facilitate disengagement of the clutch according to the vehicle installation.

Still another object of the invention is to provide a novel spring-engageable clutch characterized by spring-engaging means and a pressure plate actuated thereby with an interposed lever-type clutch-operating mechanism mounted on the exterior of the clutch housing co-rotatable with the engine flywheel, to facilitate clutch disengagement and controllable re-engagement.

Other objects, features and advantages of the invention will be apparent from the following detailed description of a preferred embodiment illustrated by way of example only, when considered in conjunction with the accompanying drawings, in which:

FIGURE 1 is a horizontal-longitudinal sectional view of a clutch embodying my invention, and wherein the operating parts are shown in clutch-engaged positions for transmission of drive-torque thereby with the clutch-pedal in fully released normal position 90° out of phase;

FIGURE 3 is a fragmentary sectional view of FIGURE 1 on an enlarged scale to bring out one of the clutch-operating levers in greater detail as well as associated structure with the disengaged position of said lever being shown in dashed lines;

FIGURE 4 is a longitudinal sectional view taken on the line 4—4 of FIGURE 1 of the self-adjusting device interposed in the clutch-pedal linkage to compensate for wear in the clutch facings for maintaining a uniform pedal stroke;

Figure 6:
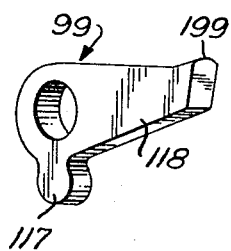

FIGURE 5 is a sectional view similar to FIGURE 4 on the same scale showing an adjusted position of the compensating device effective to shorten the pedal-linkage to compensate for a new released position of the clutch-operating yoke resulting from wear in the clutch facings; and FIGURE 6 is a perspective view of one of the thrust-transmitting pawls (clutch element) incorporated in the self-adjusting device.

Referring to the drawing, and particularly FIGURE 1 thereof, I have disclosed a portion of a motor vehicle and the power plant therefor in operative association with spring-engageable clutch mechanism (device) CM embodying my invention. The power plant is illustrated as an internal-combustion engine E by fragmentary portions of its crankshaft CS and flywheel FW, and has associated therewith the conventional manual change-speed transmission fragmentarily shown at T and through which the ground wheels of the vehicle may be driven at different gear ratios as is well understood in the art. The clutch CM is arranged to be disengaged and controllably reengaged by means of a clutch-actuator (clutch-pedal CP) mounted in the operator's compartment of the vehicle, and which is adapted for operator-actuation or by other means, such as a clutch-servo.

The spring-engageable friction clutch

As shown in FIGURE 1, the engine-driven clutch CM is operatively incorporated on the flywheel FW, and is enclosed by a bell-shaped housing 10 which also encloses the flywheel, the latter being co-rotatable with the crankshaft CS by means of cap screws 11 which secure the rear flanged end 12 of the crankshaft to said flywheel. The rear face of the flywheel has mounted thereon a centrally apertured cup-shaped backing (cover) plate 13 having a stepped wall configuration merging in an outstanding annular flange 14 defining its open end which is contiguous to said face, said flange being attached to the flywheel by means of cap screws 15 or otherwise. The stepped configuration of the cover plate wall comprises an annular segment 16 normally projecting rearwardly from the inner periphery of said flange 14, a radial segment 17 normally projecting inwardly from the rear end portion of said annular segment and in spaced parallel relation to said flange 14, and another annular segment 18 normally projecting rearwardly from the inner end of said radial segment with the free end of segment 18 terminating in an annular outstanding flange 19 in spaced parallel relation to said radial segment for an important function to appear.

Movably enclosed within the space obtaining between the said radial segment 17 and flywheel, is a pressure plate 20 which is characterized by a friction face 21 on the side confronting a complemental friction face 22 defining the rear side of said flywheel, said pressure plate and cooperating friction faces being of annular configuration as shown. The side of the pressure plate opposite the friction face 21 is characterized by a plurality of circumferentially spaced cylindrical extensions (lugs) 23 radially offset from the axis of said clutch, and which project rearwardly through a corresponding number of registering flanged holes 24, respectively, formed in the medial portion of the radial segment 17 of the cover plate 13. The lugs projecting through the holes 24 serve to lock the pressure and cover plates for co-rotational movement while accommodating axial movement of the pressure plate relative to the cover plate and flywheel to engage and disengage the clutch in a well known manner.

The aforesaid lugs 23 (preferably six) are alternately formed with flats 25 on opposite sides, that is, three of these lugs are plain and the other three are formed with the flats aforesaid. Projecting from the rear ends of each of these lugs is a reduced diameter threaded portion 26, the diameter of which is the same width as the flatted portions which produce rectangular portions 27 on the three lugs having the flats.

Figure 2:
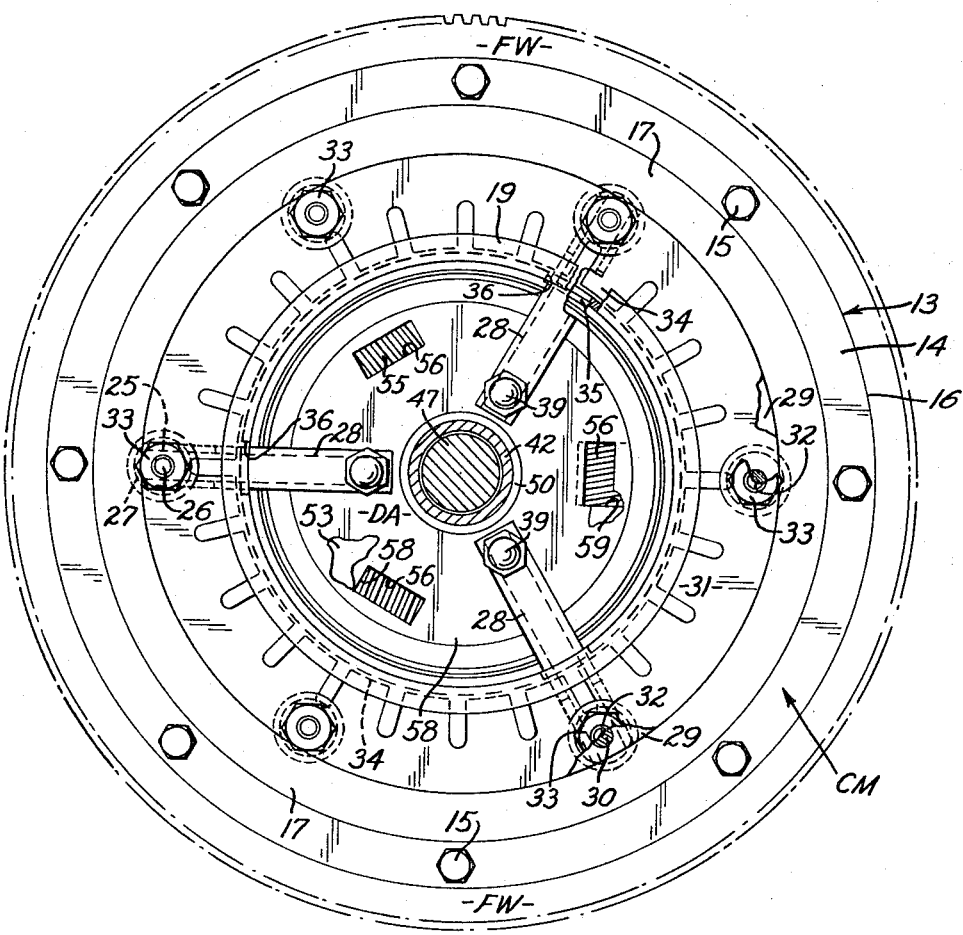
FIGURE 2 is a transverse sectional view taken along the line 2—2 of FIGURE 1 showing details of the spring-engaging means and clutch-operating mechanism for overcoming said spring means to disengage the clutch.

The pressure plate is actuatable by a plurality (preferably three) of radially disposed clutch-operating levers 28 arranged in circumferentially spaced relation best shown in FIGURE 2, and which are preferably formed in U-shaped cross section for rigidity with their outer ends slotted for straddle-mounting the rectangular segments 27 on said flatted extensions for pivotal movement against confronting face portions on an annular pressure ring 29 best shown in FIGURE 3. This pressure ring is formed with six holes 30 in circumferentially matching relationship with the aforesaid threaded portions projecting from said lugs and through which said threaded portions project. Contiguously disposed with respect to the outer (rear) face of said pressure ring, is the outer peripheral marginal portion of a washer type spring 31 normally under tension and formed with a like-number of holes 32 through which said threaded portions on the lugs pass for reception of lock-nuts 33 to impinge the spring and pressure ring in a unitary assembly on the pressure plate, and thereby providing novel mounting of the clutch-engaging spring on the exterior of the cover plate 13 between the latter and said pressure plate. Therefore, the pressure plate, lugs, pressure ring and spring move as a unit both axially and rotationally. The inner peripheral portion of the spring 31 is formed with a plurality of finger-like elements 34 characterized by flexibility and which project radially inwardly toward the axis of the clutch CM as best shown in FIGURES 2 and 3.

The inner ends of these finger-like elements 34 are adapted to bear against the inner face of the aforesaid outstanding flange 19, and when these finger-like elements are installed under tension (compressed) sufficient to force the pressure plate 20 forwardly toward the flywheel FW the clutch will be engaged as will appear.

Each of the clutch-operating levers 28 is pivotally mounted (fulcrumed) on the forward slightly offset edge 35 of a cutout 36 in the annular segment 18, the purpose of these cutouts being to enable each of the levers to project therethrough to dispose the arcuate edges 37 of the straddle-mounted portions of each lever to have working relationship with the confronting faces on the pressure ring aforesaid so that the outer end portion of said levers can be mounted on the exterior of the cover plate 13 rather than conventionally on the interior thereof. The inner ends of the clutch levers 28 are provided with an adjustable dome-faced nut 39 which threadingly passes through the levers as shown in FIGURE 3 under a tight-thread condition so that the adjusted position of these nuts remains stabilized until a new adjustment is deliberately made. These dome-faced nuts lie in circular alignment in slightly spaced relationship to the working face 40 of the clutch throw-out bearing 41 when the clutch members are fully engaged as shown in FIGURE 1. It is therefore, seen that pressure applied by forward movement of the throw-out bearing is effective on the dome-faced nuts to force the inner ends of the clutch levers forwardly which acts through their fulcrums aforesaid against their outer pressure-applying ends to withdraw the pressure plate 20 from the flywheel FW to disengage the clutch CM as is understood.

The clutch throw-out bearing 41 is slidably mounted on a suppport sleeve 42 which is flanged outwardly at its rear end 43 for mounting as by cap screws 44 on the forward side of the end wall 45 of the transmission casing in coaxial relationship to the clutch assembly. Actuation of the clutch throw-out bearing 41 through the central aperture of the cover plate 13 is effected by the clutch-pedal CP to separate the pressure plate from the flywheel FW in opposition to the clutch-engaging spring 31 and thereby disengaging the clutch CM as shown in dashed lines on FIGURE 1.

A clutch driven disc assembly generally designated DA is slidably splined at 46 on the clutch output (driven) shaft 47 for co-rotation therewith, said splined formation being disposed adjacent the forward reduced shaft extension 48 which is piloted in a preferably roller-type bearing 49 nested in a complemental concavity formed centrally in the flanged end of said crankshaft CS best shown in FIGURE 1. The disc assembly is conventional in all respects and comprises: a central hub 50 internally splined at 51 to engage complemental external splines 52 defining the aforesaid splined formation on said output shaft 47 and thereby providing relative axial (floating) movement therebetween without interrupting co-rotational movement thereof, said hub being characterized by an annular outstanding flange 53 to which is attached a friction disc 54 to one side of said flange by means of a plurality of coil-type cushioning springs 55 which vary in number according to clutch design. These cushioning springs are nested in a corresponding number of registering rectangular openings 56, 57 provided in the disc and a balance ring 58, respectively, mounted on the opposite side of the flange 53 in radially offset relation to the axis of the clutch output shaft 47. The cushioning springs which are normally preloaded, more particularly are carried by the flange in radially disposed slots 59 indented in the peripheral marginal portion thereof and which normally register with the openings 56, 57 formed in the disc 54 and balance ring 58, respectively. The clutch disc and balance ring are connected by radially disposed rivets 60 to rotate as a unit with the intermediate normal body portion 61 of each rivet in circular alignment with oversize arcuate slots 62 processed in the peripheral marginal portion of said flange 53, whereby the oversized relationship of the slots with respect to the rivet bodies provides relative rotational movement of limited degree between the flanged hub and connected clutch disc assembly DA for the cushioning springs to function to absorb load and road shocks transmittable through the drive line to the clutch assembly as well as the engine to the drive line thus contributing to smooth transmission of drive torque between the engine and driving wheels of the vehicle whether engine-applied or by coasting-load drive.

It is the aforesaid outboard mounting of the clutch-engaging spring 31 and cooperating clutch-operating levers between said spring and the clutch housing 13 that provide for flexibility in establishing the proper leverage-ratio for shorter pedal stroke with easy manipulation, since clutch housing interference is not involved. In the conventional mounting of the clutch-engaging and operating means, such components are disposed within the clutch housing carried on the flywheel thus limiting the changes in leverage-ratio between the operating levers and pressure plate actuated thereby.

The opposing outer peripheral marginal portions on the clutch friction disc 54 are provided with annular friction facings 63, 64, respectively. These facings are disposed between the said friction faces 21, 22 on the pressure plate and flywheel, respectively, to impinge the disc assembly DA between the pressure plate and flywheel under pressure plate actuation by the single clutch-engaging spring 31, whereby the flywheel and pressure plate are frictionally locked to the clutch disc assembly DA to rotate as a unit for transmission of engine drive-torque to the associated gearing T and drive line (not shown) connected to the driving wheels (not shown) of the vehicle.

The output shaft 47 passes through the support sleeve 42, flanged mounting end 43 which serves as a bearing and oil-retaining means between the clutch and transmission, with the bearing 65 being adapted to support the rear end of the output shaft 47 where it passes through the front end wall of the transmission casing.

The throw-out yoke (lever) 66 is pivotally mounted (fulcrumed) intermediately on the clutch housing by means of an interconnecting strut 67 which is formed at its free end as a ball-end 68 and the opposite end having a threaded connection at 69 with said clutch housing to rigidly support said strut. The inner end 70 of the yoke straddles the aforesaid support sleeve 42, and is formed with arcuate faces 71 for engaging interposed shoes 72 adapted to bear on the rear face of the clutch throw-out bearing 41. The intermediate portion of the yoke is formed with a socket 73 for reception of the ball-end of the strut and which is stabilized in said socket by means of a flat retaining spring 74 fixed at one end by means of a rivet to said yoke as shown in FIGURE 1. The outer end portion 75 of the yoke projects to the exterior of the bell-shaped clutch housing through an opening 76 and a dust-excluding boot 77 with the extreme end portion formed with a centrally apertured concavity 78 for reception of one end of a self-adjusting take-up device TD for maintaining pedal stroke uniform irrespective of the amount of wear in the clutch facings which changes the normal position of the throw-out yoke when the clutch CM is fully engaged.

*The self-adjusting linkage device between the clutch-pedal and throw-out yoke for maintaining uniform pedal stroke*

Reference is now made to my novel self-adjusting linkage take-up device generally designated TD, and shown in FIGURES 1, 4, 5 and 6.

This wear compensating device to shorten the linkage for uniform stroke of the pedal comprises: an outer body part 81, and an inner body part 82 telescopically mounted with respect to each other for rectilinear movements in unison and relative to each other.

The outer body part is an elongated cylindrical sleeve 83 having one end formed with an axially-bored reduced exterior extension 84, and the opposite end is open and provided with an internally threaded terminating portion 85. A closure cap 86 is provided with a complementally threaded portion 87 for engaging the threads in the sleeve to close the open end thereof. The closure cap terminates on its exterior in a reduced diameter extension 88 having an annular groove 89 for reception of the free end of a retaining spring 90 anchored at its opposite end to the aforesaid strut by means of a rivet as shown in FIGURE 1. The latter extension has a terminating dome-shaped portion 91 which nests in the aforesaid concavity 78 in the outer end of the yoke 66 for universal movement with respect thereto. A reduced extension 92 projects rearwardly from said dome-shaped portion in coaxial relationship thereto through said concavity aperture to prevent fortuitous displacement between said self-adjusting device TD and said yoke should the retaining spring 90 fail in its purpose. Accordingly, the self-adjusting take-up device TD is pivotally mounted at its rear end on the outer end of the clutch throw-out yoke 66 as above described and illustrated on the drawing.

The inner body part is an elongated axially-bored cylindrical element, the inner end of which normally projects substantially halfway into the space obtaining between the inner ends of the closure cap and forward end of the outer body part 81 as shown, and is disclosed herein as a pawl-carrying portion (member) PM formed with an elongated sleeve 96 which projects to the exterior of the outer body part through the axial bore in the reduced extension 84. The pawl-carrying portion comprises a piston-like flange 97 diametrically slotted at 98 for reception of a pair of movable pawls 99, respectively, pivotally mounted in said slots on transverse pins 100, and which normally occupies the aforesaid space within the outer body part. The outer end of said sleeve 96 carries an annular detachable cap 101.

A pawl-actuator PA disclosed herein as an elongated rod 102 projects through the axial bore in said inner body part to the exterior thereof and said outer body part for pivotal connection at 103 to the lower arm 104 of the clutch-pedal CP. The upper arm 105 of said pedal terminates in a foot-pad 106 for operator application of actuating pressure thereto. The clutch-pedal is pivotally mounted at the juncture of its lower and upper arms on a shaft 107 fixed at one end to a portion 108 of the vehicle. A stop pin 109 fixed on said vehicular portion limits the retractive (release) movement of the clutch-pedal corresponding to full clutch engagement.

A pedal return spring 111 is operatively connected at opposite ends between the lower arm of said pedal and said fixed portion on the vehicle, respectively, to bias the said pedal and connected linkage toward normally released (relaxed) position for full clutch engagement. This spring also serves to reinstate the limited relative operating movement of the pedal for actuating the aforesaid pawls 99 into engaged position (see FIGURE 5) with said outer body part prior to the latter being moved by said pedal to disengage the clutch CM as will appear.

The pawl-actuator PA is provided with an external annular groove 112 which receives a split stop ring 113, the latter being normally spaced predeterminately from the capped-end portion of the inner body part to define the aforesaid relative pawl-actuating movement of said actuator. The extreme forward end portion of the pawl-actuator is processed with threads for installation of an adjustable clevis 114 to effect said pivotal connection 103 with the lower arm of the clutch-pedal.

Accordingly, pressure applied to the foot-pad of the clutch-pedal CP is effective to rotate the same in a counterclockwise direction as viewed from FIGURE 1, to effect through the linkage connection a corresponding direction of rotation of the clutch throw-out yoke 66 and thereby disengage the clutch CM against reaction from the clutch-engaging spring 31.

The outer capped end 101 of the inner body part is engageable by a striker element 116 fixed at one end to a fixed portion of the vehicle. When the striker is engaged by the capped-end of the inner body part, the pawl-actuator PA is provided with limited relative operating movement as shown by the space obtaining between said stop ring 113 and the confronting side of the capped-end of said elongated sleeve 96. This is the normal relationship between fully released clutch-pedal position under influence of the pedal return spring 111 and fully disengaged condition of the aforesaid pawls 99 as shown in FIGURES 1 and 4, respectively, whereby the latter are operative to provide for shortening of the linkage connection between the clutch-pedal and clutch pressure plate in the event that the latter becomes the prime mover as a result of wear in the clutch facings. The clutch-pedal is normally the prime mover for controlling clutch operations, but if wear in the clutch facings is such that reaction from the engaging spring 31 continues to apply pressure on the clutch throw-out yoke 66 after the clutch-pedal has returned to normal released position, then the self-adjusting take-up device TD becomes effective to compensate for such wear by shortening the linkage connection to relax the yoke and thereby reinstating the clutch-pedal as the prime mover for clutch operations.

Each of the pawls 99 as shown in FIGURE 6, is formed with a lower depending arm 117 and a longer substantially horizontal arm 118 which terminates in a prong 119 adapted to selectively engage a plurality of circular serrations (clutch elements) 121 formed in the inner surface of the outer body part 81. These serrations are characterized by a plurality of axially spaced circular shoulders 122 normal to the axis of the self-adjusting device TD, and interconnecting angular ramp segments 123 therebetween, whereby outward radial movement of the pawls 99 is effective to engage their respective prongs in the registering serration after the device TD has operated to shorten the pedal linkage, to lock the inner and outer body parts in their axially adjusted positions to move as a unit under influence of pedal-actuation to operate the clutch throw-out yoke 66 to disengage the clutch CM. It should be noted here that the pawls are capable of locking these two components for movement as a unit in one direction only to disengage the clutch CM.

The free ends of the lower arms 117 of the pawls 99 terminate in a rounded contour which engages an annular groove 124 formed in the pawl-actuator PA whereby limited reciprocable movement aforesaid as defined by the stop ring 113 and another stop ring 125 engaging a complemental external annular groove 126 adjacent the inner end of said pawl-actuator PA, is established, said latter stop ring normally engaging the inner end of said piston-like flange 97 when the clutch-pedal CP is fully released for full clutch engagement under influence of the single clutch-engaging spring 31.

A conical-type compression spring 127 is operatively disposed between the inner end of said piston-like flange 97 and the inner end of the threaded portion of the closure cap 86. Both ends of this spring being stabilized against disalignment by means of annular shoulders 128, 129 defining the inner ends of said piston-like flange 97 and closure cap 86, respectively. The purpose of this conical spring is to bias the inner and outer body parts apart to lightly take-up the slack in the clutch linkage when the clutch CM is fully engaged, but without sufficient force to create a wearing pressure between the clutch throw-out bearing 41 and the inner ends of the clutch-operating levers 28 and said yoke 66.

Operational summary

Although the manner in which my invention achieves its objectives should be manifest from the foregoing description augmented by an inspection of the drawing, a brief restatement will be given to insure a clear understanding of the novel coaction of the various components as follows:

Assuming the clutch CM is fully engaged as demonstrated by FIGURE 1, under influence of the single diaphragm-type spring 31, and the clutch pedal CP in normal released position defined by its lower arm 104 in engagement with the stop pin 109 under influence of the pedal return spring 111. Also, the outer capped-end 101 of the inner body part 82 is in engagement with the striker element 116 to establish the normal released position of said inner body part. Accordingly, the fixed striker element 116 and the stop pin are effective when engaged to define the normal released positions of the inner body part and the clutch-pedal CP, respectively, which provides for a uniform movement of said clutch-pedal between its two extremes, and a normal released position for said inner body part 82, corresponding to full clutch engagement.

In the normal positions aforesaid of said pawl-carrying portion PM and clutch-pedal, the abutment ring 113 on said pawl-actuator is spaced from the confronting capped-end of said inner body part 82, and the other abutment ring 125 is abutting the confronting inner end of said pawl-carrying portion PM as shown in FIGURE 4. Under these conditions, any change of position from normal of the clutch throw-out yoke 66 due to wear in the clutch facings carried by the driven disc assembly DA, requires that the linkage connection which includes the self-adjusting take-up device TD between the clutch-pedal and throw-out yoke be shortened to prevent spring-engaging action on the pressure plate 20 from holding the clutch friction members in "slipping" engagement under influence of said clutch-engaging spring 31 transmitting reaction through the clutch-operating levers 28, thence to the clutch throw-out bearing 41 and connected inner end of the throw-out yoke 66 because the latter cannot move clockwise as viewed in FIGURE 1 the compensating distance requisite for relaxation thereof due to the clutch-pedal CP being against its stop pin 109.

Therefore, the self-adjusting take-up device TD must be made operative to enable the outer body part 81 to move the required compensating distance relatively to the inner body part 82 to shorten the linkage connection between the outer end of the throw-out yoke 66 and the lower arm 104 of the clutch-pedal CP and thereby enabling spring-engagement of the clutch CM irrespective of changes in the normal released position of the clutch throw-out yoke 66 as a result of wear in the clutch facings. Such changes in the normal released position of the clutch throw-out yoke 66 being always in a clockwise direction toward the clutch-pedal as viewed in FIGURE 1 because clutch facing wear moves the pressure plate 20 closer to the engine flywheel FW under influence of the clutch-engaging spring 31. This movement of the pressure plate 20 is transmitted through the three extensions 23 having the flatted portions to accommodate straddle-mounting of the outer ends of the clutch-operating levers 28 so that their arcuate working edges can engage the pressure ring 29 fixed on the exterior of all six extensions 23 (plain and flatted), and thence to the clutch throw-out bearing 41 which in turn moves farther outwardly from said flywheel to rock the clutch throw-out yoke 66 on its fulcrum and thereby imparting clockwise movement thereto according to the degree of movement of the pressure plate to effect firm lock-up of the friction disc assembly DA between the pressure plate and flywheel for full engagement of the clutch CM upon full release of the clutch-pedal CP as is understood.

It is thus seen that the self-adjusting take-up device TD is operable to shorten the linkage connection between the clutch-pedal CP and throw-out yoke 66 when the locking pawls 99 are disengaged from their cooperating series of closely generated clutch elements indented in the inner cylindrical surface of the outer body part 81 as shown in FIGURE 4 wherein the clutch-pedal is in normal position, the pawl-carrying portion PM in its normal position, and the abutment ring 113 in spaced relation to the confronting capped-end 101 of the inner body part 82, and the other abutment ring 125 on the pawl-actuator PA is in abutting relationship to the inner end of said pawl-carrying portion PM.

Under these conditions the clutch throw-out yoke 66 is in normal relaxed position with the clutch friction members spring-biased into full lock-up condition. The conical separating spring 127 is reacting between the inner and outer body parts with sufficient force to take-up the backlash that may be present in the clutch linkage connection which includes the clutch-operating levers 28, said latter spring when installed being under preload of such degree so as to maintain the pedal connections to the clutch-operating levers 28 free of backlash but in no case exerting a force of such magnitude that would cause wear between the inner ends of the clutch-operating levers, throw-out bearing 41, and clutch throw-out yoke 66.

If it is desired to disengage the clutch CM, the operator would apply foot-pressure to the foot-pad of the clutch-pedal CP and thereby rotate the same counterclockwise on its pivotal shaft 107 to first dashed line position as shown in FIGURE 1 to take-up the relative movement between the abutment ring 113 and the capped-end 101 of the inner body part 82 which relative movement rotates the pawls 99 on their pivotal pins 100 in a counterclockwise direction as viewed in FIGURE 5 to engage their prongs on the horizontal arms with the registering clutch serration on the outer body part 81. Additional rotation of the clutch-pedal CP to second dashed line position is effective to move the pawl-actuator PA, pawl-carrying portion PM and outer body part 81 as a unit to rotate the clutch throw-out yoke 66 on its fulcrum in a counterclockwise direction to slide the throw-out bearing 41 toward the engine flywheel, and thus rotating the clutch-operating levers 28 on their pivotal fulcrums to retract (withdraw) the pressure plate 20 from the disc assembly DA in opposition to reaction from the clutch-engaging spring 31 whereby clutch-disengagement is rendered effective as shown in dashed lines applied to the pressure plate 20 in FIGURE 1.

During such disengaging operation of the clutch CM, the clutch-pedal is the prime mover, but upon release of the clutch-pedal for clutch re-engagement under bias of the clutch-engaging spring 31, this spring becomes the prime mover opposed by force exerted on the clutch-pedal by the operator.

If wear is present in the clutch facings of negligible degree, the parts will assume their normal relaxed positions as shown in FIGURES 1, 2 and 3 for full clutch engagement under reaction from the spring 31, but if sufficient wear has occurred, this means that the clutch throw-out yoke 66 will take up a new normal released position as explained above which new position cannot be established unless the outer body part 81 of the self-adjusting take-up device TD is released as shown in FIGURE 4 for relative longitudinal movement with respect to the inner body part 82 to compensate for this new yoke position requiring a shorter linkage connection with the clutch-pedal CP. Accordingly, when the clutch-pedal has been fully released against its stop pin 109 upon the capped-end 101 of the inner body part 82 engaging the striker element 116 to establish the normal released position of the part 82, this operation restores the relative operating movement between the abutment ring 113 and capped-end of said inner body part 82 as shown in FIGURES 1 and 4, and if there are present reactive force from the clutch-engaging spring 31 against said pedal which prevents the clutch CM from fully engaging, but with the pawls 99 disengaged as shown in FIGURE 4, the outer body part 81 is released to move under such spring reactive force to establish a new relationship between the prongs of the pawls and cooperating clutch serrations indented in the outer body part. The conical separating spring 127 yields to accommodate this new relative relationship between the inner and outer body parts, whereupon the next clutch-disengaging cycle as above described, will effect locking of the pawl prongs in a new clutch serration corresponding to the shortened length of the linkage connection between the clutch-pedal and outer body part 81. Subsequently, the clutch-pedal can be operated to second dashed line position as shown in FIGURE 1 and thereby disengage the clutch CM in the same manner as above described in detail.

It is thus seen that the self-adjusting take-up device TD is effective to shorten the clutch-pedal linkage connection aforesaid only when the clutch-pedal has been fully released against its stop pin 109 to disengage the pawls 99, and, should wear of sufficient degree be present in the clutch facings, the normal released position of the throw-out yoke 66 is changed, that is, the outer end is closer to the clutch-pedal. Such change in the normal position of the clutch throw-out yoke is compensated for by a corresponding relative movement of the outer body part 81 to the inner body part 82. Since the pedal moves through a uniform stroke to disengage and control re-engagement of the clutch CM, the self-adjusting take-up device TD provides the special advantage of enabling such clutch stroke to remain uniform throughout the service life of the clutch facings.

I have thus provided a simple and positive means for maintaining pedal (actuator) stroke uniform throughout the service life of the clutch facings.

Further considering the novel friction clutch mechanism CM disclosed in the present application, I have resorted to a novel arrangement of the clutch-operating levers 28 to enable a wider range of leverage-ratios available for a relatively shorter pedal stroke in controlling said clutch mechanism. This novel improvement is accomplished by placing the clutch-operating levers 28 on the exterior of the clutch cover plate rather than on the interior thereof as commercially practiced. By locating the said levers on the exterior of the clutch cover plate a wide range of fulcrum and extreme pressure points can be utilized to obtain not only a relatively shorter pedal stroke but also requiring less pressure for operation than conventional height pedals which are characterized by an unduly long stroke to facilitate disengagement of the clutch by reason of limitations in establishing the leverage-ratio of the clutch-operating levers 28 due to interference of the clutch cover plate.

A further and important advantage is provided by the novel arrangement of the clutch-operating levers 28 on the exterior of the cover plate, by the interposition of the outer pressure-applying ends of the levers in series with the clutch pressure plate and spring-engaging means therefor with the latter also positioned on the exterior of the clutch cover plate. The clutch-operating levers act directly on the clutch-engaging spring 31 when withdrawing the pressure plate from the driven disc assembly DA. Locating the clutch-engaging spring on the outside of the cover plate has the additional merit of enabling use of a wider range of spring designs, since the cover plate offers no interference.

The foregoing description is believed to set forth clearly the achieving of the various stated objectives of my invention and to describe the advantageous results to be derived therefrom. In the broader patent sense, the clutch-pedal may be termed an energizable clutch-actuator with included means for energizing the same.

The present invention contemplates use of any type of spring-engageable or pressure-engageable clutch whether the clutch-operating levers 28 are actuated by the disclosed clutch-pedal CP or fluid pressure means. It is thus seen that the present novel clutch has a wide range of practical applications in motor vehicles and the like whether the clutch is driver or power-operated.

The preferred embodiment of the invention herein disclosed has been illustrated and described to explain the nature of the invention by way of example only. It will be obvious that changes, substitutions and modifications in the details and their interaction may be resorted to by persons skilled in the art to which the invention relates without departing from the scope or fair meaning defined by the terms of the subjoined claims.

Having thus described my invention, I claim:

1. In a friction clutch, the combination of a driving engine-driven flywheel and driven shaft, a driven disc carried by said shaft, an annular pressure plate encircling said shaft, an actuator for actuating said pressure plate, an annular cover member secured to said flywheel and cooperating therewith to substantially house the driven disc and pressure plate, a plurality of circumferentially spaced lugs laterally projecting from said pressure plate, a corresponding number of similarly spaced holes in said cover member and through which said lugs, respectively, pass to the exterior of the cover member, to lock said pressure plate and cover member for co-rotational movement and to accommodate relative axial movement of said pressure plate, a plurality of pressure plate operating members pivotally fulcrumed intermediately on the exterior of said cover member with their outer end portions contiguous to the exterior thereof, and which are connected to certain of said lugs, respectively, to actuate said pressure plate, and their inner end portions being adapted for actuation by a clutch throw-out bearing slidably related with said shaft to withdraw said pressure plate from said driven disc and said flywheel to disengage said clutch, spring means including a normally compressed spring contiguous to the exterior of said cover member and operably reacting between the latter and said lugs to oppose actuation of said pressure plate by said operating members whereby clutch engagement is effected, and means connecting said actuator to said throw-out bearing for actuating said operating members and connected pressure plate in opposition to said spring means.

2. In a friction clutch, the combination of a driving engine-driven flywheel and driven shaft, a driven disc carried by said shaft, an annular pressure plate encircling said shaft, an operator-operated member for actuating said pressure plate, an annular cover member secured to said flywheel and cooperating therewith to substantially house the driven disc and pressure plate, a plurality of circumferentially spaced lugs laterally projecting from said pressure plate, a corresponding number of similarly spaced holes in said cover member and through which said lugs, respectively, pass to the exterior thereof, to lock said pressure plate and cover member for co-rotational movement and to accommodate relative axial movement of said pressure plate, a plurality of pressure plate operating members pivotally fulcrumed intermediately on the exterior of said cover member with their outer end portions contiguous to the exterior thereof, and which are connected to certain of said lugs, respectively, to actuate said pressure plate, and their inner end portions being adapted for actuation by a clutch throw-out bearing slidably related with said shaft to withdraw said pressure plate from said driven disc and said flywheel to disengage said clutch, spring means including a normally compressed spring contiguous to the exterior of said cover member and operably reacting between the latter and said lugs to oppose actuation of said pressure plate by said operating members whereby clutch engagement is effected, and means connecting said operator member to said throw-out bearing for actuating said operating members and connected pressure plate in opposition to said spring means.

3. In a friction clutch, the combination of a driving engine-driven flywheel and driven shaft, a driven disc carried by said shaft, an annular pressure plate encircling said shaft, an actuator for actuating said pressure plate, an annular cover member secured to said flywheel and cooperating therewith to substantially house the driven disc and pressure plate, said cover member having an inner terminal outstanding flange, a plurality of circumferentially spaced lugs laterally projecting from said pressure plate, a corresponding number of similarly spaced holes in said cover member and through which said lugs, respectively, pass to the exterior thereof, to lock said pressure plate and cover member for co-rotational movement and to accommodate relative axial movement of said pressure plate, a plurality of pressure plate operating members pivotally fulcrumed intermediately on the exterior of said cover member with their outer end portions contiguous to the exterior thereof, and which are connected to certain of said lugs, respectively, to actuate said pressure plate, and their inner end portions being adapted for actuation by a clutch throw-out bearing slidably related with said shaft to withdraw said pressure plate from said driven disc and flywheel to disengage said clutch, spring means including a normally tensioned washer-type spring contiguous to the exterior of said cover member and having its outer peripheral portion secured to said lugs, and its inner peripheral portion adapted to react on said cover flange and thereby biasing said pressure plate into frictional engagement with said driven disc and the latter into frictional engagement with said flywheel, and means connecting said actuator to said throw-out bearing for actuating said operating members and connected pressure plate in opposition to said spring means to disengage said clutch.

4. In a friction clutch, the combination of a driving engine-driven flywheel and driven shaft, a driven disc carried by said shaft, an annular pressure plate encircling said shaft, an operator-operated member for actuating said pressure plate, an annular cover member secured to said flywheel and cooperating therewith to substantially house the driven disc and pressure plate, said cover member having an inner terminal outstanding flange, a plurality of circumferentially spaced lugs laterally projecting from said pressure plate, a corresponding number of similarly spaced holes in said cover member and through which said lugs, respectively, pass to the exterior thereof, to lock said pressure plate and cover member for co-rotational movement and to accommodate relative axial movement of said pressure plate, a plurality of pressure plate operating members pivotally fulcrumed intermediately on the exterior of said cover member with their outer end portions contiguous to the exterior thereof, and which are connected to certain of said lugs, respectively, to actuate said pressure plate, and their inner end portions being adapted for actuation by a clutch throw-out bearing slidably related with said shaft to withdraw said pressure plate from said driven disc and flywheel to disengage said clutch, spring means including a normally tensioned washer-type spring contiguous to the exterior of said cover member and having its outer peripheral portion secured to said lugs, and its inner peripheral portion adapted to react on said cover flange and thereby biasing said pressure plate into frictional engagement with said driven disc and the latter into frictional engagement with said flywheel, and means connecting said operator member to said throw-out bearing for actuating said operating members and connected pressure plate in opposition to said spring means to disengage said clutch.

5. In a friction clutch, the combination of a driving engine-driven flywheel and driven shaft, a driven disc carried by said shaft, an annular pressure plate encircling said shaft, an actuator for actuating said pressure plate, an annular cover plate secured to said flywheel and cooperating therewith to substantially house said driven disc and pressure plate, said cover plate having an outer outstanding flange mounted on said flywheel, first and second stepped annular segments in spaced parallel relation to said outer flange, a radial segment interconnecting said stepped segments, another outstanding flange defining the rear end of said second stepped segment, a plurality of circumferentially spaced cutouts in the last-defined segment with one edge of said cutouts providing a fulcrum, and a plurality of circumferentially spaced flanged holes in said radial segment, a like-number of circumferentially spaced lugs laterally projecting from said pressure plate through said flanged holes, respectively, to lock said pressure and cover plates for co-rotational movement and to accommodate relative axial movement of said pressure plate, a plurality of radially disposed pressure plate operating levers pivotally fulcrumed intermediately on said cutout fulcrums, respectively, with their outer end portions positioned on the exterior of said cover plate and pivotally connected to a corresponding number of lugs, respectively, to actuate said pressure plate, and their inner end portions being adapted for actuation by a clutch throw-out bearing slidably related with said shaft to withdraw said pressure plate from said driven disc and flywheel to disengage said clutch, spring means including a normally tensioned washer-type spring contiguous to the exterior of said cover plate and having its outer peripheral portion secured to said lugs for unitary movement, and its inner peripheral marginal portion defined by a plurality of flexible fingers projecting radially inwardly toward the axis of said clutch shaft into engagement with said other cover flange and thereby biasing said pressure plate into frictional engagement with said driven disc and the latter into frictional engagement with said flywheel, and means connecting said actuator to said throw-out bearing for actuating said levers and connected pressure plate in opposition to said spring means to disengage said clutch.

References Cited by the Examiner

UNITED STATES PATENTS

| | | | |
|---|---|---|---|
| 1,874,268 | 8/1932 | Fink | 192—99 X |
| 2,277,221 | 3/1942 | Gamble | 192—68 |
| 2,421,869 | 6/1947 | Brock | 192—111 |
| 2,589,308 | 3/1952 | Thelander | 192—89 X |
| 2,641,344 | 6/1953 | Banker | 192—89 X |
| 2,727,612 | 12/1955 | Thelander | 192—68 X |

DAVID J. WILLIAMOWSKY, *Primary Examiner.*

BENJAMIN W. WYCHE, *Examiner.*

UNITED STATES PATENT OFFICE
CERTIFICATE OF CORRECTION

Patent No. 3,314,511

April 18, 1967

Glenn T. Randol

It is certified that error appears in the above identified patent and that said Letters Patent are hereby corrected as shown below:

In the drawings, Sheet 2, FIG. 6, "199" should read -- 119 --. Column 1, line 59, "preloaded compressed)" should read -- preloaded (compressed) --. Column 3, line 73, "washer type" should read -- washer-type --. Column 4, line 37, after "is" insert a comma; line 40, "acts" should read -- act --. Column 6, line 37, "ends" should read -- end --. Column 7, line 11, "disengage" should read -- disengaging --. Column 9, line 9, after "elements" insert -- 121 --. Column 10, line 4, "are" should read -- is --.

Signed and sealed this 13th day of January 1970.

(SEAL)
Attest:

Edward M. Fletcher, Jr.
Attesting Officer

WILLIAM E. SCHUYLER, JR.
Commissioner of Patents